No. 635,067. Patented Oct. 17, 1899.
F. L. WHITE.
SUPPORT FOR BRACKETS OR HOLDERS FOR VELOCIPEDE OR BICYCLE LAMPS.
(Application filed Jan. 27, 1899.)
(No Model.)
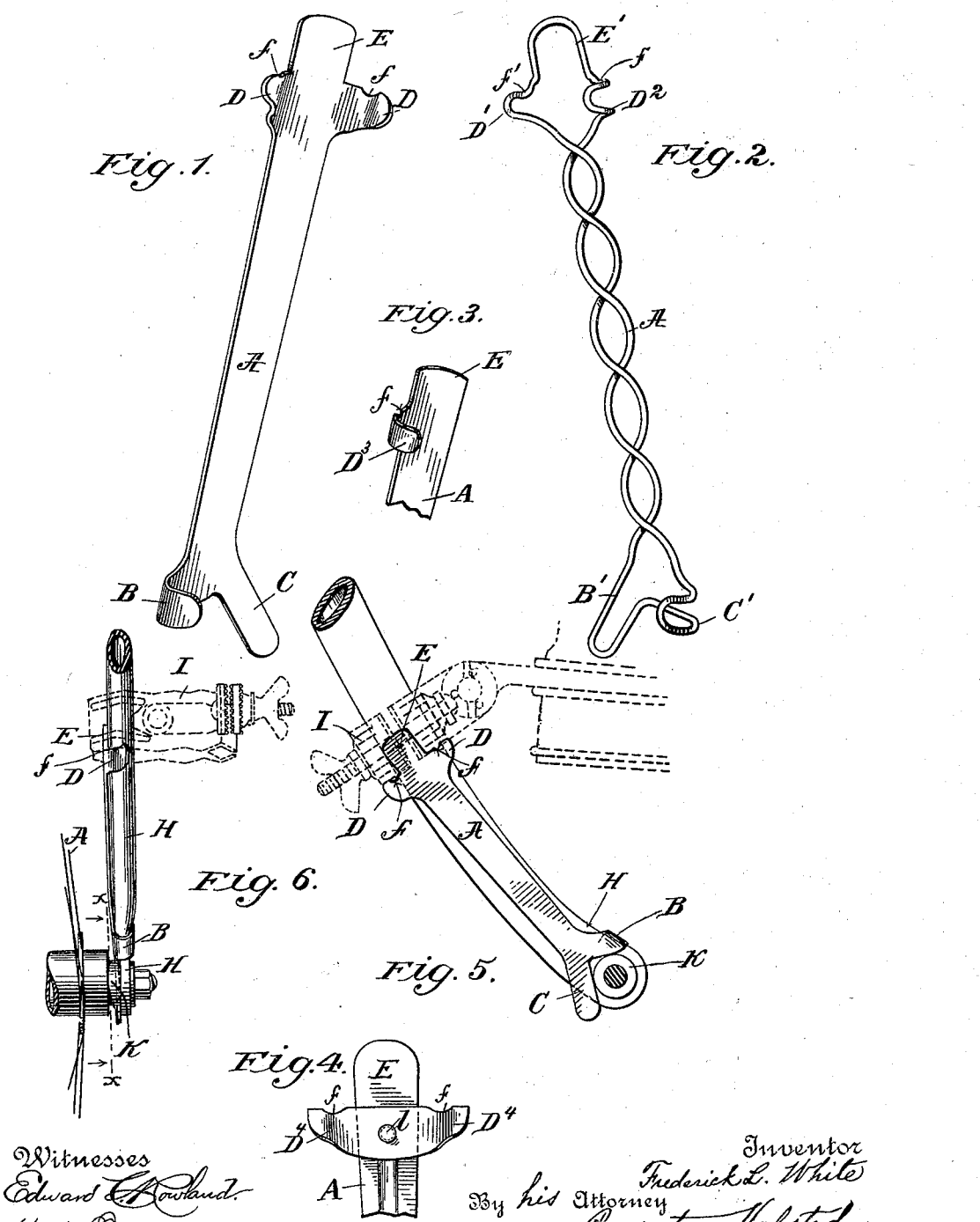

UNITED STATES PATENT OFFICE.

FREDERICK L. WHITE, OF WATERBURY, CONNECTICUT, ASSIGNOR TO GEORGE H. CLOWES, OF SAME PLACE.

SUPPORT FOR BRACKETS OR HOLDERS FOR VELOCIPEDE OR BICYCLE LAMPS.

SPECIFICATION forming part of Letters Patent No. 635,067, dated October 17, 1899.

Application filed January 27, 1899. Serial No. 703,571. (No model.)

*To all whom it may concern:*

Be it known that I, FREDERICK L. WHITE, a citizen of the United States, residing at Waterbury, in the county of New Haven and State of Connecticut, have invented a certain new and useful Support for the Bracket or Holder of a Velocipede or Bicycle Lamp, of which the following is a specification.

The object of my invention is to furnish a support for the bracket or holder of a velocipede or bicycle lamp when said bracket is clamped to the fork, so as to preclude all possibility of the bracket with the lamp attached from sliding down the fork and coming in contact with the spokes of the wheel in case the clamp should become loosened on the fork from jarring or otherwise.

To this end my invention consists generally of an elongated body with a recess at its lower end, an arm or arms extending forward from the side or sides of the body, and a head or tongue extending above said arm or arms. The two legs of the support on either side of the recess are adapted to straddle the axle of the front wheel of the velocipede or bicycle, the elongated body resting longitudinally upon one prong of the fork and the two arms of the support embracing said prong. The bracket is then to be clamped to both the fork and the tongue of the support and rest upon its arm or arms. The bracket will thus hold the support in place against the fork and the arm or arms of the support will form a stop to prevent the bracket and lamp from sliding down the fork.

In the accompanying drawings, Figure 1 illustrates a perspective view of one form of my lamp-bracket support. Fig. 2 is a perspective view of another form. Figs. 3 and 4 illustrate still other forms. Fig. 5 illustrates a side view of the support shown in Fig. 1 as applied to the left prong of a bicycle-fork and acting as a brace for the bracket and lamp, the axle and sleeve being in section on the line X X of Fig. 6. Fig. 6 shows an edge view of the same.

Similar letters represent like parts in all the figures.

My support (shown in Figs. 1, 5, and 6) is composed of a flat strip of metal, having the elongated body A, two diverging legs B and C, forming a recess between them, and said legs extending from the lower end of said body, the two arms D D extending from the two opposite sides of the body A, but in the same direction, and the head or tongue E extending above the arms D. The leg B is bent back so as to inclose within its bend the upper edge of the bicycle-fork prong H. (Shown in Figs. 5 and 6.) The two arms D D are also provided with recesses $ff$ on their upper edges to receive the lower edges of the lamp-bracket I when the same rests upon said arms to more securely retain said bracket in its proper position on the support, as shown in Figs. 5 and 6. Said figures show the support applied to the left prong of the bicycle-fork, resting upon the inner side of the same, and with the two legs B and C straddling the wheel-axle K, the crotch or recess between the same resting on said axle and the leg B bent over the front edge of the fork-prong H and resting upon said edge.

When the support and bracket are secured to the bicycle-fork in the manner above described and with said bracket tightly clamping the tongue E and prong H, it will be impossible for the bracket to slide down the fork.

Fig. 2 shows my improved support as made of one piece of bent wire, but with the opposite leg C' to that shown in the other figures bent back to adapt the support for attachment to the right prong of the fork instead of the left. The arm $D^2$ on the same side as the bent arm C' is also bent to enable it also to inclose and rest upon the upper edge of the prong. The rest of the parts A, B, C, D, E, and F correspond substantially in configuration to the parts A, B, C, D, E, and F in the other figures.

In Fig. 3 only one arm $D^3$ is used, and this is shown bent back like $D^2$ to embrace and rest upon the edge of the fork-prong H, and this one arm $D^3$ will be sufficient to hold the upper end of the support in place.

In Fig. 4 the two arms $D^4 D^4$ are united to form a cross-bar which is pivoted at $l$ to the elongated body A. This construction permits the support to adapt itself to and to fit bicycle-forks of different curvatures and also to fold the cross-bar up against the body A, so as to make a more compact package for carrying without lateral projections.

What I claim as new, and desire to secure by Letters Patent, is—

1. A support for a lamp bracket or holder, consisting of an elongated body with a recess at its lower end, an arm extending from the side of the body, and a tongue extending above said arm, all as and for the purposes set forth.

2. A support for a lamp bracket or holder, consisting of an elongated body with a recess at its lower end, two arms extending from opposite sides of the body but in the same direction, and a tongue extending above said arms, all as and for the purposes set forth.

3. A support for a lamp bracket or holder, consisting of an elongated body with a recess at its lower end, an arm extending from the side of the body and having a recess in its upper edge, and a tongue extending above said arm, all as and for the purposes set forth.

4. A support for a lamp bracket or holder, consisting of an elongated body with a recess at its lower end, a cross-bar pivoted to the body and having its arms extending from opposite sides of said body, but in the same direction, and a tongue extending above said cross-bar, all as and for the purposes set forth.

5. A support for a lamp bracket or holder, consisting of an elongated body terminating at one end in two legs, two arms extending from opposite sides of the body but in the same direction, and an extension of the body above the arms forming a head or tongue, all as and for the purposes set forth.

6. A support for a lamp bracket or holder, consisting of an elongated body terminating at one end in two legs, one of which is bent back, two arms extending from opposite sides of the body, but in the same direction, and an extension of the body above the arms forming a head or tongue, all as and for the purpose set forth.

7. A support for a lamp bracket or holder, consisting of an elongated body terminating at one end in two legs, two arms extending from opposite sides of the body but in the same direction, and provided with recesses in their upper edges, and an extension of the body above the arms forming a head or tongue, all as and for the purposes set forth.

FREDERICK L. WHITE.

Witnesses:
V. M. SHAW,
JNO. DONALDSON.